United States Patent
Ungermann

(10) Patent No.: US 11,072,320 B2
(45) Date of Patent: Jul. 27, 2021

(54) DRIVER ASSISTANCE SYSTEM HAVING AN EMERGENCY STOP FUNCTION WHICH CAN BE ACTIVATED VIA A PARKING BRAKE OPERATOR CONTROL ELEMENT

(71) Applicant: Bayerische Motoren Werke Aktiengesellschaft, Munich (DE)

(72) Inventor: Soeren Ungermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 396 days.

(21) Appl. No.: 16/111,485

(22) Filed: Aug. 24, 2018

(65) Prior Publication Data

US 2018/0362013 A1 Dec. 20, 2018

Related U.S. Application Data

(63) Continuation of application No. PCT/EP2017/053583, filed on Feb. 17, 2017.

(30) Foreign Application Priority Data

Feb. 25, 2016 (DE) ...................... 10 2016 203 020.5

(51) Int. Cl.
*B60T 10/00* (2006.01)
*B60W 10/18* (2012.01)
(Continued)

(52) U.S. Cl.
CPC ........... *B60W 10/182* (2013.01); *B60K 28/00* (2013.01); *B60T 7/085* (2013.01); *B60T 7/14* (2013.01);
(Continued)

(58) Field of Classification Search
None
See application file for complete search history.

(56) References Cited

U.S. PATENT DOCUMENTS 10,821,952 B2 * 11/2020 Baehrle-Miller ..... B60T 13/588
2006/0225971 A1 10/2006 Jaeger
(Continued)

FOREIGN PATENT DOCUMENTS

DE   10 2005 016 001 A1   10/2006
DE   10 2010 044 024 A1   5/2012
(Continued)

OTHER PUBLICATIONS

International Search Report (PCT/ISA/210) issued in PCT Application No. PCT/EP2017/053583 dated Jun. 9, 2017 with English translation (five (5) pages).
(Continued)

*Primary Examiner* — James M McPherson
(74) *Attorney, Agent, or Firm* — Crowell & Moring LLP

(57) ABSTRACT

A driver assistance system has an emergency stop function for a motor vehicle. The motor vehicle has an electric parking brake. A parking-brake operating element is used to activate the electric parking brake. The driver assistance system is designed to activate an emergency stop function in accordance with the actuation of the parking-brake operating element and, as part of the emergency stop function, to perform an autonomous emergency stop driving maneuver for the emergency stopping of the vehicle. The driver assistance system is characterized in that the driver assistance system is designed to activate the emergency stop function only in response to an end of the actuation of the parking-brake operating element.

19 Claims, 2 Drawing Sheets

(51) Int. Cl.
  *B60T 7/14* (2006.01)
  *B60K 28/00* (2006.01)
  *B60W 50/00* (2006.01)
  *B60T 7/08* (2006.01)
  *B60W 30/12* (2020.01)
  *B60T 17/20* (2006.01)
  *B60T 13/66* (2006.01)

(52) U.S. Cl.
  CPC ........ *B60W 30/12* (2013.01); *B60W 50/0098* (2013.01); *B60T 13/662* (2013.01); *B60T 17/20* (2013.01); *B60W 2050/0095* (2013.01); *B60W 2540/26* (2013.01); *B60Y 2302/05* (2013.01)

(56) References Cited

U.S. PATENT DOCUMENTS

| | | | |
|---|---|---|---|
| 2012/0006634 A1* | 1/2012 | Bensch | B60T 7/085 188/106 P |
| 2012/0123644 A1 | 5/2012 | Waldmann | |
| 2013/0018545 A1* | 1/2013 | Prakah-Asante | B60W 40/04 701/36 |
| 2017/0008528 A1* | 1/2017 | Nakatsuka | B60W 50/10 |

FOREIGN PATENT DOCUMENTS

| | | |
|---|---|---|
| DE | 10 2012 001 312 A1 | 8/2012 |
| DE | 10 2011 109 618 A1 | 2/2013 |
| DE | 10 2012 024 370 A1 | 7/2013 |
| DE | 10 2012 008 090 A1 | 10/2013 |

OTHER PUBLICATIONS

German-language Written Opinion (PCT/ISA/237) issued in PCT Application No. PCT/EP2017/053583 dated Jun. 9, 2017 (five (5) pages).

German-language Search Report issued in counterpart German Application No. 10 2016 203 020.5 dated Sep. 21, 2016 with partial English translation (twelve (12) pages).

Kämpchen N et al., "Umfelderfassung für den Nothalteassistenten—ein System zum automatischen Anhalten bei plötzlich reduzierter Fahrfähigkeit des Fahrers [Sensing of the surroundings for an emergency stop assistant —a system for automatically stopping in the case of a suddenly reduced ability to drive of the driver]", BMW Group Forschung and Technik, 2010, Muenchen, Germany (sixteen (16) pages).

\* cited by examiner

DRIVER ASSISTANCE SYSTEM HAVING AN EMERGENCY STOP FUNCTION WHICH CAN BE ACTIVATED VIA A PARKING BRAKE OPERATOR CONTROL ELEMENT

CROSS REFERENCE TO RELATED APPLICATIONS

This application is a continuation of PCT International Application No. PCT/EP2017/053583, filed Feb. 17, 2017, which claims priority under 35 U.S.C. § 119 from German Patent Application No. 10 2016 203 020.5, filed Feb. 25, 2016, the entire disclosures of which are herein expressly incorporated by reference.

BACKGROUND AND SUMMARY OF THE INVENTION

The invention relates to a driver assistance system having an emergency stop function and to a method for performing an emergency stop of a motor vehicle.

Document DE 10 2010 044 024 A1 which forms the closest prior art discloses a driver assistance system with an emergency stop function for a motor vehicle. The vehicle comprises an electric parking brake and a parking brake operator control element in the form of a switch which can be pulled for the purpose of actuation and by which the parking brake can be actuated. There is provision that the parking-brake operator control element can be actuated even during travel, wherein in this case the vehicle is braked independently of the actuation of the brake pedal. This is referred to as normal braking in the document. Moreover, in the case of continuous actuation of the operator control element beyond a predefined minimum time period (e.g. 10 seconds), an emergency stop function can be activated in which the vehicle changes, for example, into an autonomous driving mode and carries out an autonomous emergency stopping maneuver. In this context, the vehicle can stop safely on the shoulder after one or more autonomously executed lane changes. The emergency stop function which is triggered manually by the driver is helpful in situations in which the driver is suddenly no longer able to drive during the journey, for example in the event of a sudden health problem (for example a heart attack).

Document DE 10 2012 001 312 A1 describes a driver assistance system in which an operator control command can be input by means of an input device, for example by use of a switch. If such an input takes place, an autonomously executable driving maneuver can be triggered. The driver assistance system permits an emergency stop to be triggered by the driver or a front seat passenger in the event of the driver becoming unable to drive. In addition there can also be provision that the operator control command validates a critical situation which has been automatically detected by the driver assistance system of the motor vehicle. The document "Umfelderfassung für den Nothalteassistenten—ein System zum automatischen Anhalten bei plötzlich reduzierter Fahrfähigkeit des Fahrers [Sensing of the surroundings for an emergency stop assistant—a system for automatically stopping in the case of a suddenly reduced ability to drive of the driver]", Nico Kampchen et al., which can be retrieved from http://www1.smart-senior.de/pdf/pub/SmartSenior_AAET_BMW_2010.pdf, describes an emergency stop assistance system. This document states that an automated emergency stop on a shoulder is the optimum procedure in the case of a low volume of traffic, while in the case of a high volume of traffic the vehicle is to be braked automatically to the stationary state within the current lane.

The object of the invention is to provide a driver assistance system with an alternative operator control concept for triggering an emergency stop function using the parking brake operator control element, wherein the operator control concept is to permit simple triggering of the emergency stop function. In addition, the object is directed to the specification of a corresponding method for performing an emergency stop of a vehicle.

The object is achieved in accordance with embodiments of the invention. Advantageous embodiments are described and claimed herein. It is to be noted that additional features of a patent claim which is dependent on an independent patent claim can form a separate invention, which is independent of the combination of all the features of the independent patent claim without the features of the independent patent claim or only in combination with a subset of the features of the independent patent claim, which invention can be made the subject matter of an independent claim, of a partial application or of a subsequent application. This applies in the same way to technical teachings which are described in the description and which can form an invention which is independent of the features of the independent patent claims. For example, the idea of the decision about the type of emergency stop driving maneuver which is to be carried out being made as a function of a variable which is characteristic of the volume of traffic can also be implemented independently of the operator control concept of the driver assistance system.

A first aspect of the invention relates to a driver assistance system having an emergency stop function for a motor vehicle. The motor vehicle comprises an electric parking brake, in particular an electromechanical parking brake (EMF). A parking brake operator control element serves to activate the electric parking brake when the motor vehicle is in a stationary state. Said parking brake operator control element is preferably an operator control element which can be actuated manually, for example a switch in the center console or in the dashboard. For example, the parking brake operator control element is a switch which has to be pulled in order to activate the parking brake. The driver assistance system is designed to activate an emergency stop function in dependence on the actuation of the parking brake operator control element, and to carry out, within the scope of the emergency stop function, an autonomous emergency stop driving maneuver for the emergency stopping of the vehicle. For example, within the scope of the autonomous emergency stop driving maneuver, the vehicle is brought to a stop on a shoulder of the roadway by proceeding from the current lane with autonomous longitudinal guidance and transverse guidance. The hydraulic service brake system is preferably used to stop the vehicle. The driver assistance system can additionally be designed to trigger automatically a flashing hazard warning light system of the vehicle and/or an emergency call within the scope of the emergency stop function.

The driver assistance system according to the invention is characterized by the fact that the driver assistance system is designed to activate the emergency stop function only in reaction to the ending of the actuation of the parking brake operator control element. Braking of the motor vehicle, which is not part of the autonomous emergency stopping maneuver, is preferably already brought about during the actuation of the parking brake operator control element (for example when a parking brake switch is pulled).

The driver assistance system according to the invention has the advantage that the emergency stop function can be activated in all cases in emergency situations by intuitively actuating the parking brake operator control element and subsequently ending the actuation. The emergency stop function is preferably activated independently of the duration of the actuation of the parking brake operator control element, without a specific minimum time period having to be exceeded. The operator (for example the driver or the front seat passenger) therefore does not necessarily need to know, with the operator control concept according to the invention, that in order to trigger the emergency stop function the parking brake operator control element has to be actuated for longer than a predefined minimum actuation period.

If manual braking of the motor vehicle, which is not part of the autonomous emergency stop maneuver, already takes place during the actuation of the parking brake operator control element, the operator control concept according to the invention permits manual braking of the vehicle to the stationary state by continuous actuation of the parking brake operator control element (for example in order to stop at the destination; and subsequently, the same operator control element can engage the parking brake) without the emergency stop function being necessarily activated during the braking maneuver, because a specific actuation time period has been exceeded.

It is, of course, conceivable that a triggering of the emergency stop function when the actuation of the parking brake operator control element ends is carried out only when the parking brake operator control element was actuated for a time period longer than or longer than or equal to a time period threshold value (e.g. 0.5 seconds or less) before the ending of the actuation.

Furthermore, the inventive operator control concept for triggering the emergency stop function has the advantage that after the actuation of the parking brake operator control element has ended, the operator controller, in particular the driver, immediately has a free hand to abort the function by means of a corresponding abort operator control action if the emergency stop function is not desired.

It is advantageous if the driver assistance system is designed already to bring about during the actuation of the parking brake operator control element braking of the motor vehicle which is not part of the emergency stop maneuver. The braking of the motor vehicle when the parking brake operator control element is actuated preferably takes place by actuating the hydraulic service brake system.

The driver therefore has the possibility of bringing about manually controlled braking of the vehicle, for example as far as the stationary state, during the travel by correspondingly long actuation of the parking brake operator control element.

The maximum deceleration during the manual braking of the vehicle is preferably greater than the maximum deceleration during the emergency stop maneuver, with the result that, for example, rapid braking can be ensured in an emergency stop situation in which the brake pedal has failed.

It is advantageous if, when the parking brake operator control element is actuated, a lane keeping function for automatically keeping to the current lane, is already activated. The lane keeping function keeps to the current lane autonomously by means of corresponding automatic transverse guidance.

Conventional active lane keeping assistance functions (for example also as part of an adaptive cruise controller with automatic transverse guidance) have also a hands-on detection system which checks whether the driver's hands are on the steering wheel and aborts the function if the driver does not have his hands on the steering wheel, in particular does not have his hands on the steering wheel for a time period which is longer than or longer than or equal to a threshold value.

The lane keeping function described above, which is activated in reaction to the actuation of the parking brake operator control element, preferably does not have this hands-on detection system, with the result that it remains active even in an emergency situation in which the driver no longer has his hands on the steering wheel.

Before the parking brake operator control element has been actuated, for example a comfort driver assistance system with lane keeping assistance function with hands-on detection system is active (in particular as part of a cruise controller with automatic transverse guidance), wherein the lane keeping assistance function automatically keeps the driver in the lane. When the parking brake operator control element is actuated, the comfort driver assistance system is preferably deactivated, and instead a lane keeping function as described above without a hands-on detection system is activated.

The driver assistance system is preferably designed to abort the emergency stop function in reaction to an operator control action (for example on the part of the driver or front seat passenger) to abort the emergency stop function.

The operator control action can be aborted, for example, by actuating a central operator control element, for example a push and press control knob, wherein the abort facility is pointed out on a display in the vehicle cockpit. It would alternatively be conceivable to abort the emergency stop function by operating a touch-sensitive screen on which the abort facility is indicated.

In addition it is conceivable for the emergency stop function to be capable of being aborted by actuating the accelerator pedal, the steering wheel or a transmission selector switch, for example in the case of significant actuation of the steering wheel or significant acceleration of the vehicle. However, when the brake pedal is actuated the emergency stop function is preferably not aborted, since this operator control action corresponds to the system action of placing the vehicle in a stationary state.

It is advantageous if the aborting is possible by actuating the parking brake operator control element itself. For example, the parking brake operator control element is a switch which can be actuated in at least two different operator control directions, for example a switch which can be both pulled and pushed.

The emergency stop function is activated, for example, in reaction to the ending of the actuation of the switch which is directed in the first operator control direction. The parking brake operator control element is therefore initially pulled and then the pulling is ended in order to trigger the emergency stop function.

The driver assistance system is preferably designed to abort the emergency stop function in reaction to actuation of the switch in a second operator control direction. In order to abort the emergency stop function, the parking brake operator control element is then pushed, for example.

The driver assistance system is designed, for example, to bring the vehicle to a stop on a shoulder of the roadway starting from the current lane with one or more lane changes within the scope of the autonomous emergency stop driving maneuver. However, it is not appropriate to stop on the shoulder in every driving situation. Instead, it may be appropriate to stop in the vehicle's own lane without changing lane.

The driver assistance system is therefore preferably designed to determine a variable which is characteristic of the volume of traffic by observing the surroundings of the vehicle, and to make the decision as to which autonomous driving maneuver is to be carried out as a function of this characteristic variable. For the purpose of observation, a surroundings sensor system is used, for example a LiDAR system, a radar system, and/or a camera system. This idea can also be used in any desired driver assistance system with an emergency stop function independently of the activation mechanism described in claim 1, wherein the driver assistance system is designed to carry out an emergency stop maneuver to bring the vehicle to an emergency stop within the scope of the emergency stop function. The activation can take place, for example, by means of an operator control element or else automatically by observing the condition of the driver.

The variable which is characteristic of the volume of traffic is, for example, a traffic density or a traffic intensity. The traffic density indicates the number of road users per unit of distance at a time. The traffic intensity describes the number of road users per unit of time in a cross section. A decision to carry out an emergency stop driving maneuver of a first autonomous emergency stop driving maneuver type when the vehicle stops in the vehicle's own lane or to carry out an emergency stop driving maneuver of a second autonomous emergency stop driving maneuver type when the vehicle stops on a shoulder of the roadway is made as a function of the variable which is characteristic of the traffic volume.

For example, in the case of a relatively low traffic volume it is decided to carry out an emergency stop driving maneuver of the second emergency stop driving maneuver type (stopping on a shoulder), whereas in the case of a traffic volume which is higher in comparison, a decision to carry out an emergency stop driving maneuver of the first emergency stop driving maneuver type (stopping in the vehicle's own lane) is made.

In order to decide about the emergency stop driving maneuver type which is to be carried out, for example a threshold value comparison of the variable which is characteristic of the traffic volume can be made with a threshold value. If the characteristic variable indicates a higher traffic volume than the traffic volume of the threshold value, it is decided, for example, to carry out an emergency stop driving maneuver of the first emergency stop driving maneuver type (stopping in the vehicle's own lane). If the characteristic variable indicates a lower traffic volume than the traffic volume of the threshold value, it is decided, for example, to carry out an emergency stop driving maneuver of the second emergency stop driving maneuver type (stopping on a shoulder with a lane change).

For example, one or more time intervals between, in each case, two vehicles are determined. The time intervals may be gross time intervals or net time intervals. One or more time intervals between the vehicle in question and the respective other vehicle can be determined. Alternatively, one or more time intervals between vehicles other than the vehicle in question can also be determined.

The variable which is characteristic of the traffic volume can be determined as a function of the one or more time intervals. For example, the variable which is characteristic of the traffic volume can be determined by averaging the time intervals. The characteristic variable corresponds, for example, to the mean value of the time intervals or to the inverse of the mean value of the time intervals (the inverse of the mean value then corresponds to a traffic intensity).

For example, the traffic volume is averaged by averaging the time intervals between vehicles over a certain observation time period (for example in an observation time period in the range from 2 to 4 minutes), and the driving maneuver is then selected as a function thereof. In the case of high traffic density, stopping in the vehicle's lane entails minimum risk, since a traffic jam is generated which protects the vehicle, and the relatively high risk that a critical situation is brought about by the dense traffic in the case of a lane change is avoided. In the case of a low traffic density, stopping on the shoulder entails minimum risk, since when stopping on the shoulder there is a greater risk of being overlooked by an inattentive fast driver, and at the same time less risk occurs in the case of lane changes, with the result that there is a higher probability of being able to drive safely onto the shoulder.

According to one embodiment of the driver assistance system according to the invention, the latter can determine driver's condition information relating to the current condition of the driver in reaction to actuation of the parking brake operator control element or in reaction to ending of the actuation of the parking brake operator control element. For example, the determination of the condition information relating to the current driver's condition is therefore started as soon as the driver actuates the operator control element.

The driver's condition information relates, for example, to the driver's condition of alertness or the driver's fitness to drive. The alertness and fitness to drive can be limited, for example, on the basis of a sudden medical emergency situation.

The driver's condition information comprises e.g. driver's condition information which is determined by means of a passenger compartment camera which is directed toward the driver, e.g. information about the direction in which the driver is looking (e.g. to the front), or whether the driver has opened his eyes and/or where the driver's head is located. Such information permits conclusions to be made about the condition of the driver, in particular about his attentiveness and his fitness to drive.

The driver's condition information can alternatively or additionally also be information which relates to the actuation or non-actuation of one or more driver operator control elements (e.g. steering wheel, brake pedal or accelerator pedal) for the manual guidance of the vehicle. For example, it is determined whether the driver actuates the driver operator control element normally, actuates it in a jolting fashion or no longer actuates it at all.

If, for example when the operator control element is actuated, a comfort driver assistance system with automatic longitudinal guidance and/or transverse guidance is automatically deactivated, it is possible to use as driver's condition information whether the driver assumes the driving task and actuates the accelerator pedal and/or the steering pedal, in particular actuates them normally.

The driver assistance system is designed to prohibit activation of the emergency stop function as a function of the driver's condition information. Alternatively or additionally, the driver assistance system can be configured to abort an emergency stop function which has already been activated.

If the parking brake operator control element is actuated for the purpose of activation, the state of attentiveness of the driver is simultaneously evaluated by means of the camera for example. If it is detected that the driver is attentive and is fit to drive, the function is not activated, for example, since it can be assumed that the driver or front seat passenger did not wish to activate the emergency stop assistant.

The use of driver's condition information permits the probability of incorrect triggering owing to incorrect operator control of the operator control element being reduced.

Since the driver is observed in reaction to the operator control action, and the driver's condition information is determined then, incorrect conclusions about the driver's condition in comparison with the use of driver's condition information which was determined before the operator control action is avoided. If, for example, a comfort driver assistance system with automatic longitudinal guidance and transverse guidance was used before the operator control action, driver observation before the operator control action would incorrectly indicate a driver who is inactive and therefore possibly unfit to drive.

The above concept for the additional use of driver's condition information is described in German patent application "Fahrerassistenzsystem mit per Bedienelement aktivierbarer Nothaltefunktion [driver assistance system with emergency stop function which can be activated by means of an operator control element]" which was submitted to the German Patent and Trademark Office by the Applicant on the same date as the present German patent priority application. The content of this German patent priority application is, expressly incorporated by reference herein.

A second aspect of the invention relates to a method for performing an emergency stop of a motor vehicle. According to the method, an emergency stop function is activated as a function of the actuation of the parking brake operator control element, and an autonomous emergency stop driving maneuver for performing an emergency stop of the vehicle is carried out within the scope of the emergency stop function. The method according to the invention is characterized by virtue of the fact that the activation of the emergency stop function is carried out in reaction to ending of the actuation of the parking brake operator control element.

The above statements relating to the inventive driver assistance system according to the first aspect of the invention also apply in a corresponding way to the inventive method according to the second aspect of the invention. Advantageous exemplary embodiments of the method according to the invention which are not described explicitly at this point or in the patent claims correspond to the advantageous exemplary embodiments of the inventive driver assistance system which are described above or described in the patent claims.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
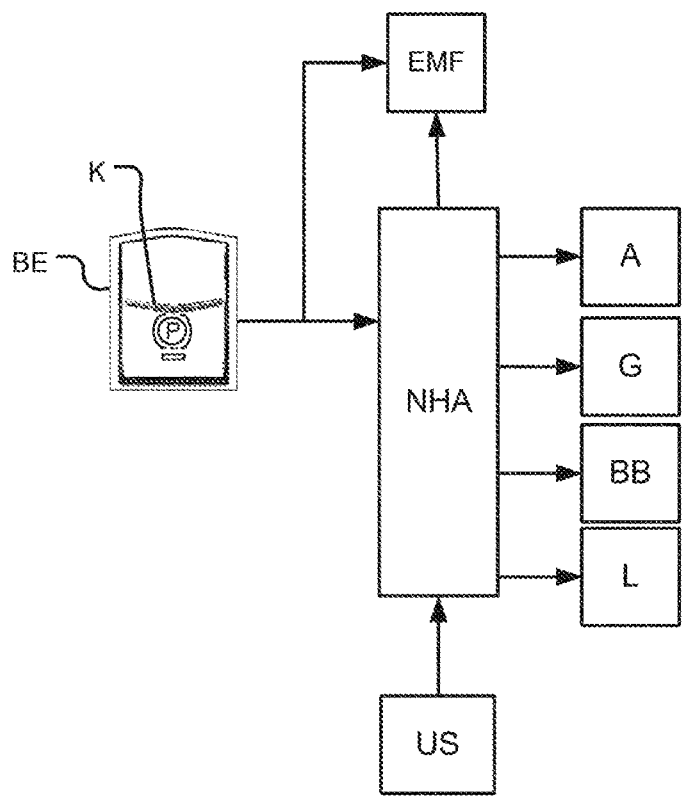
FIG. 1 shows an exemplary embodiment of a driver assistance system according to the invention.

FIG. 1 is a schematic illustration of a first exemplary embodiment of an inventive emergency stop assistance system NHA with an emergency stop function, which emergency stop assistance system NHA is integrated in a motor vehicle, in particular in a passenger car. The motor vehicle comprises an electric parking brake EMF and a parking brake operator control element BE for activating the electric parking brake EMF.

The parking brake operator control element BE for activating the electric parking brake EMF is preferably a switch which is pulled by the operator in order to activate the electric parking brake EMF. For this purpose, for example the finger is engaged behind the edge K of the operator control part and the operator control part of the switch BE is pulled. The parking brake operator control element BE can preferably also be pressed in the opposite operator control direction, in order, for example, to deactivate the electric parking brake EMF.

An emergency stop function of the emergency stop assistance system NHA can be activated as a function of the actuation of the parking brake operator control element BE, in the scope of which emergency stop assistance system NHA the vehicle then carries out an autonomous emergency stop driving maneuver to perform an emergency stop of the vehicle, for example on the shoulder.

During the autonomous emergency stop driving maneuver, the longitudinal guidance and transverse guidance of the vehicle take place automatically. The emergency stop assistance system therefore assumes the vehicle guidance until the vehicle is brought to a stationary state. For this purpose, the emergency stop assistance system controls the drive A, the transmission G, the hydraulic service brake BB and the steering L via intermediate units (not illustrated).

In order to plan and carry out the emergency stop driving maneuver, information on the surroundings of a surroundings sensor US, which observes the surroundings of the vehicle, is received.

In the case of the exemplary emergency stop assistance system NHA, the emergency stop function does not already activate in reaction to actuation of the parking brake operator control element BE but rather activates only in reaction to ending of the actuation of the parking brake operator control element BE.

The method of functioning of the exemplary emergency stop assistance system NHA is explained below in conjunction with FIG. 2 and FIG. 3.

Figure 2:
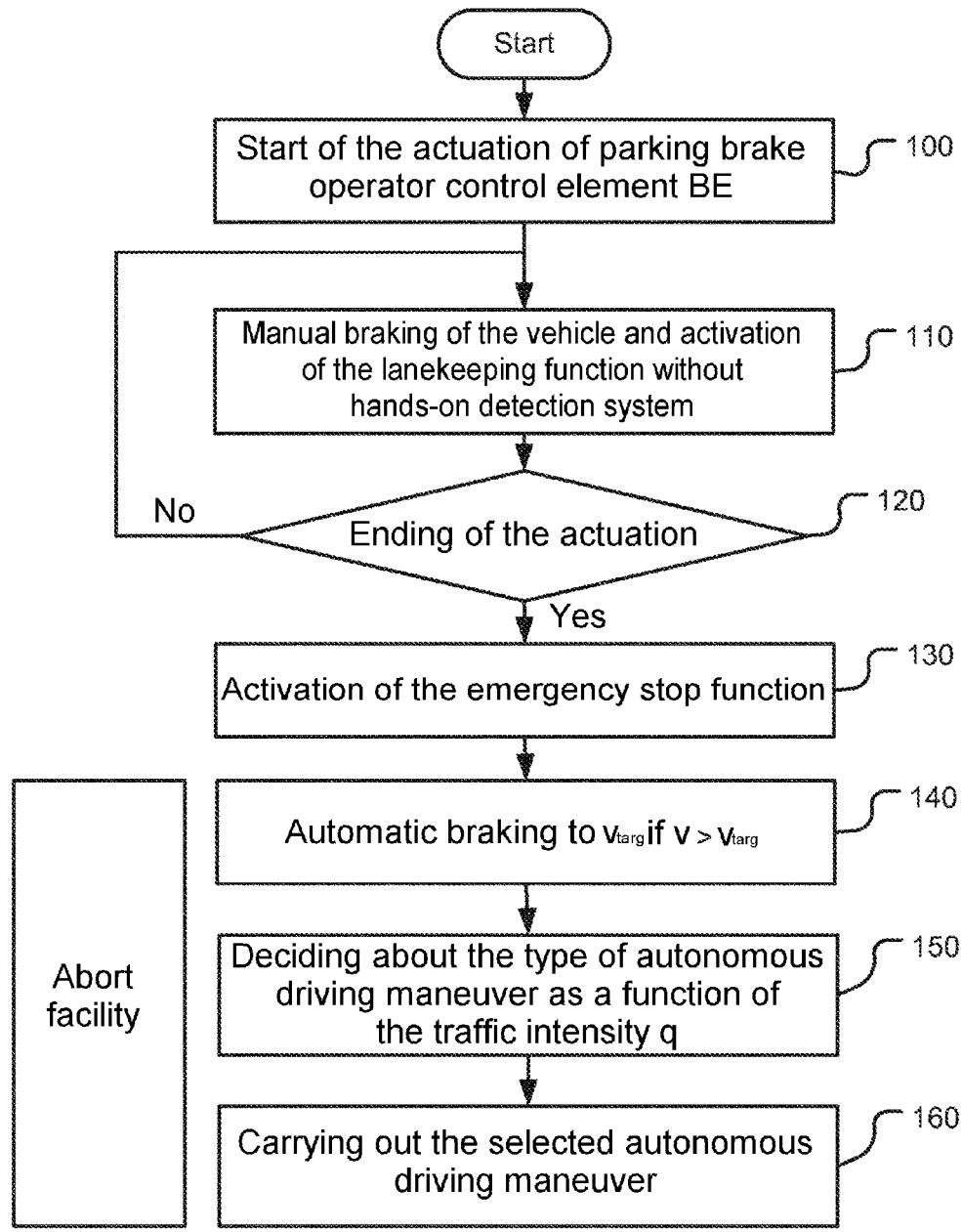
FIG. 2 shows an exemplary flowchart.

In step 100 of the flowchart in FIG. 2 it is detected that an operator (for example the driver or the front seat passenger) has started to actuate the parking brake operator control element BE. In FIG. 3, the actuation B_BE of the parking brake operator control element BE is illustrated. At the time $t_1$ the actuation B_BE of the parking brake operator control element BE starts by the switch BE being pulled.

In reaction to the actuation of the parking brake operator control element BE, the vehicle is braked, for example by means of the hydraulic service brake BB. This manual braking corresponds to the step 110 in FIG. 2. The acceleration a of the vehicle which is illustrated in FIG. 3 becomes negative here and reaches a particular maximum absolute value of the deceleration. The vehicle is decelerated further for as long as the parking brake operator control element BE continues to be actuated.

Moreover, a comfort assistance system which happens to be active and which has automated transverse guidance, for example a lanekeeping assistant with a hands-on detection system, is automatically deactivated in reaction to the actuation of the parking brake operator control element BE.

A lane keeping function without a hands-on detection system for automatically keeping to the current lane is activated in reaction to the actuation of the parking brake operator control element BE.

This manual braking process and the activated lanekeeping function are understood not to be part of the emergency stop function according to the application.

According to step 120, it is continuously checked whether the operator has ended the actuation of the operator control element BE.

At the time $t_2$, the operator ends the actuation of the parking brake operator control element BE; the switch BE is released.

In reaction to ending of the actuation of the parking brake operator control element BE, the emergency stop function is activated (see step 130 in FIG. 2). The activation of the function is indicated to the driver, for example on a central display in the vehicle cockpit.

The emergency stop function can, however, be aborted at any time after its activation, for example by actuation of a central operator control element. The abort facility is therefore indicated on a display in the vehicle cockpit. Alternatively, the emergency stop function can be aborted by pressing the switch BE. Furthermore, the emergency stop function can be aborted by actuating the accelerator pedal or the steering wheel.

After the activation of the function, the vehicle is automatically decelerated in its own lane to a specific target speed $v_{targ}$, e.g. $v_{targ}$=100 km/h, if it does not already have a speed of $v_{targ}$ or less (see step 140). The maximum deceleration during the braking of the vehicle before the activation of the emergency stop function is higher than during the emergency stop maneuver.

The transverse guidance specification for keeping to the lane during the braking is formed by lane markings; if the latter cannot be perceived by the vehicle, adjustment is performed with respect to the vehicle in front for the transverse guidance.

At the time $t_3$ the vehicle has reached the target speed $v_{targ}$ of 100 km/h.

Figure 3:
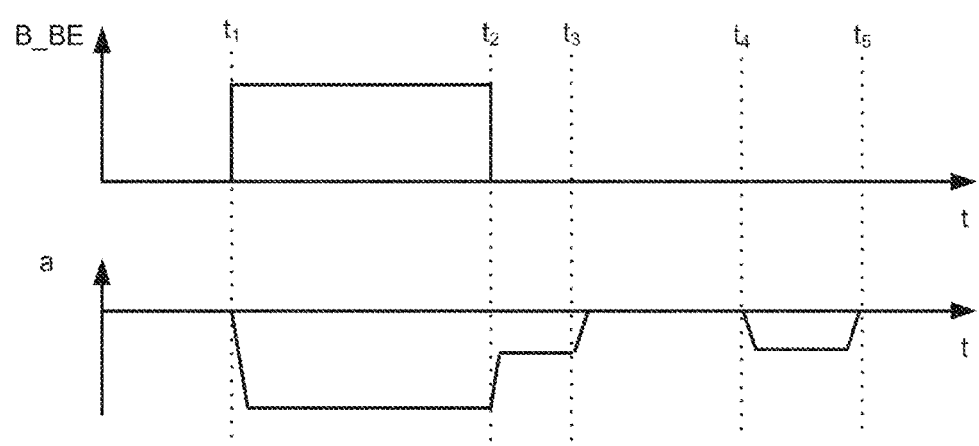
FIG. 3 shows exemplary time profiles of the actuation of the parking brake operator control element and of the vehicle acceleration.

It is now decided whether the vehicle is to change autonomously onto the shoulder and stop there or alternatively stop on the current lane (see step 150 in FIG. 3).

For this purpose, the traffic intensity q or some other variable which is characteristic of the traffic volume and which has been determined by previous observation of the surroundings of the vehicle by means of the surroundings sensor system US is used.

In addition, further ambient conditions such as, for example, the type of road (freeway or country road) or the presence of lane boundaries can be taken into account in the decision.

The variable q which is characteristic of the traffic volume is determined by averaging time intervals between vehicles. For example, the time interval to the vehicle in front, the time interval to the vehicle traveling directly behind the vehicle in question, the time intervals between detected objects in the lane to the left of the vehicle in question (if this lane is present) and the time intervals between detected objects in the lane to the right of the vehicle in question (if this lane is present) are determined for this purpose.

The variable q which is characteristic of the traffic volume can then be determined as a function of the time intervals and the number of detected vehicles. The observation of the traffic volume is already carried out continuously before the actuation of the parking brake operator control element. The value of the variable q which is characteristic of the traffic volume can also already be calculated before the actuation of the parking brake operator control element.

An exemplary decision strategy is described below:

In the case of a freeway with relatively low traffic volume ($q<q_{th}$) and lane boundaries which can be detected easily, an autonomous driving maneuver is carried out with one or more lane changes and stopping on the shoulder.

In the case of a freeway with a relatively high traffic volume ($q>q_{th}$) with or without detectable lane boundaries, stopping in the vehicle's own lane is carried out as an autonomous driving maneuver.

In the case of a freeway without detectable lane boundaries and a vehicle in front which can be detected, stopping occurs in the lane of the vehicle in question.

In the case of a freeway without lane boundaries and without a detectable vehicle in front deceleration to a stationary state is carried out without automatic transverse guidance.

In the case of a country road or in town traffic with detectable lane boundaries or with a vehicle in front, stopping takes place in the lane of the vehicle in question.

In the case of a country road or in town traffic without lane boundaries or without a vehicle which can be detected in front, deceleration to a stationary state takes place without transverse guidance.

In addition to the autonomous driving maneuver, after the activation of the emergency stop function the flashing hazard warning light is activated. In addition, an emergency call to a call center is set up. Before the setting up of the emergency call, notification is given of the imminent setting up of the call and of the abort possibility. Moreover, when the emergency stop function is activated, one or more longitudinal safety assistance systems are activated, for example an automatic emergency brake assistant which assists or automatically initiates an emergency braking operation in the case of danger arising owing to an obstacle.

If stopping on the shoulder has been selected as an emergency stop driving maneuver, the adjacent lane is monitored for rapidly overtaking vehicles, lateral risks of collision, and slow objects in front of the vehicle, and, insofar as is possible according to the monitoring, a slow lane change is carried out with the current speed ($v_{targ}$ or slower). The lane change is repeated, optionally, once or repeatedly until the vehicle has reached the shoulder (see time $t_4$ in FIG. 3). The vehicle decelerates as far as the stationary state there, until the stationary state is reached at the time $t_5$.

If stopping in the vehicle's own lane has been selected, the vehicle is decelerated to a stationary state. The transverse guidance specification for keeping to the lane during this time is the roadway marking; if this cannot be detected, adjustment with respect to the vehicle in front is carried out. If the latter is not present or cannot be detected, deceleration to a stationary state is carried out without transverse intervention.

If the vehicle is stationary, the transmission position P is automatically engaged, the central locking system unlocked and the interior light switched on, in order to draw attention to the driver; the flashing hazard warning light system remains activated. Moreover, the parking brake EMF can be engaged automatically.

If the vehicle is stationary, the vehicle engine remains on, and an automatic engine stop which is otherwise triggered by an engine start/stop function is suppressed so that air-conditioning systems such as the passenger compartment heating system, seat heating system or the passenger compartment cooling system, if these were previously active, remain active until help arrives.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
a parking brake operator control element actuatable to activate an electric parking brake of the motor vehicle; and
a control unit configured to activate an emergency stop function of the motor vehicle in response to an ending of an actuation of the parking brake operator control element to activate the electric parking brake,
wherein the emergency stop function includes carrying out an autonomous emergency stop driving maneuver that brings the motor vehicle to a stop.

2. The system of claim 1, wherein the control unit is further configured to activate the electric parking brake, in response to and during the actuation of the parking brake operator control element, and independent of the emergency stop driving maneuver.

3. The system of claim 1, wherein the control unit is further configured to activate a lane keeping function for automatically keeping to a current lane, in response to the actuation of the parking brake operator control element.

4. The system of claim 3, wherein the lane keeping function is a lane keeping function without hands-on detection.

5. The system of claim 1, wherein the control unit is further configured to abort the emergency stop function in response to an operator control action to abort the emergency stop function.

6. The system of claim 5,
wherein the parking brake operator control element is a switch which is actuatable in two different operator control directions,
wherein the emergency stop function is activated in response to ending actuation of the switch in a first operator control direction, and
wherein aborting the emergency stop function is in response to actuation of the switch in a second operator control direction.

7. The system of claim 6, wherein the two different operator control directions are a pushing and pulling of the switch.

8. The system of claim 1, wherein the autonomous emergency stop driving maneuver brings the motor vehicle to a stop on a roadway shoulder, starting from a current lane, via autonomous longitudinal guidance and transverse guidance.

9. The system of claim 1, wherein the control unit is further configured to:
determine a variable characteristic of traffic volume by observing the surroundings of the vehicle,
decide, as a function of the variable, between:
(i) executing the emergency stop driving maneuver, whereby the motor vehicle is stopped in its present lane, or
(ii) executing the emergency stop driving maneuver, whereby the motor vehicle is autonomously guided to and stopped on a shoulder of the roadway, and
carry out the emergency stop driving maneuver in accordance with the decision.

10. The system of claim 9, wherein the variable is a traffic density variable or a traffic intensity variable.

11. The system of claim 9, wherein the control unit is further configured to:
determine one or more time intervals between two vehicles, and
determine the variable as a function of the one or more time intervals.

12. The system of claim 1, wherein the control unit is configured to decide whether to execute the autonomous emergency stop driving maneuver without transverse guidance.

13. The system of claim 12, wherein the decision of whether to execute the autonomous emergency stop driving maneuver without transverse guidance is based on detecting at least one of: lane boundaries and a preceding vehicle.

14. The system of claim 1, wherein the parking brake operator control element is a switch actuatable by pulling, and the emergency stop function is activated in response to ending the pulling of the switch.

15. The system of claim 1, wherein the control unit is further configured to:
determine driver condition information relating to a current condition of a driver of the motor vehicle, in response to the actuation of the parking brake operator control element, or to the ending of the actuation of the parking brake operator control element, and
in accordance with the driver condition information, to prohibit the activation of or abort the emergency stop function.

16. The system of claim 15, wherein the control unit is further configured to:
decide, based on the driver condition information, whether to activate the emergency stop function, and
in response to deciding not to activate the emergency stop function, prohibit the activation of or abort the emergency stop function.

17. The system of claim 15, wherein the control unit is further configured to determine the driver condition information via at least one of: a passenger compartment camera, and driver operator control elements for performing manual guidance of the vehicle.

18. The system of claim 1, wherein the motor vehicle comprises a comfort driver assistance system with at least one of: automatic longitudinal guidance and transverse guidance, and the control unit is configured to deactivate the comfort driver assistance system in response to the actuation of the parking brake operator control element.

19. A method for performing an emergency stop of a motor vehicle, comprising the steps of:
activating an emergency stop function of the motor vehicle in response to an ending of an actuation of a parking brake operator control element, wherein the actuation of the parking brake operator control element activates an electric parking brake of the motor vehicle independent of the emergency stop function; and
carrying out an autonomous emergency stop driving maneuver in accordance with the emergency stop function, so as to bring the motor vehicle to a stop.

* * * * *